(12) United States Patent
Wood et al.

(10) Patent No.: US 7,302,185 B2
(45) Date of Patent: Nov. 27, 2007

(54) DEVICE AND METHOD FOR MILLIMETER WAVE DETECTION AND BLOCK CONVERSION

(75) Inventors: Jerry Busby Wood, Melbourne, FL (US); Mark Koontz, Melbourne, FL (US); Randall K. Morse, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 500 days.

(21) Appl. No.: 11/074,985

(22) Filed: Mar. 8, 2005

(65) Prior Publication Data

US 2006/0233551 A1 Oct. 19, 2006

(51) Int. Cl.
*H04B 10/00* (2006.01)
(52) U.S. Cl. .......................... 398/115; 398/116
(58) Field of Classification Search .......... 398/115, 398/116, 118, 151
See application file for complete search history.

(56) References Cited

U.S. PATENT DOCUMENTS

| 5,710,651 | A | * | 1/1998 | Logan, Jr. ............... 398/168 |
| 6,163,395 | A | * | 12/2000 | Nemecek et al. ............ 398/198 |
| 6,850,710 | B1 | * | 2/2005 | Mells ........................ 398/163 |
| 2003/0128917 | A1 | | 7/2003 | Turpin et al. ................. 385/24 |
| 2004/0264977 | A1 | * | 12/2004 | Yap et al. .................... 398/161 |
| 2005/0111853 | A1 | * | 5/2005 | Kawanishi et al. ........ 398/187 |

* cited by examiner

*Primary Examiner*—Dalzid Singh
(74) *Attorney, Agent, or Firm*—Allen, Dyer, Doppelt, Milbrath & Gilchrist, P.A.

(57) ABSTRACT

The device includes a first fiber optic transmitter (FOT) to receive a millimeter wave (MMW) signal and to generate a multiple sideband optical signal, and a second FOT to generate a second optical signal, from a reference signal. A first wavelength division multiplexing (WDM) optical filter is connected to the first FOT to separate a first sideband into a plurality of first sideband channels, and to separate a second sideband into a plurality of second sideband channels, and a second WDM optical filter is connected to the second FOT to separate a reference sideband into a plurality of reference sideband channels. A detector receives the plurality of first sideband channels, to detect an active channel from among the plurality of first sideband channels. Fiber arrays receive the plurality of second sideband channels, and the plurality of reference sideband channels, and an optical coupler generates a combined signal therefrom. A photodetection block receives and processes the combined signal based upon the detected active channel.

23 Claims, 4 Drawing Sheets

DEVICE AND METHOD FOR MILLIMETER WAVE DETECTION AND BLOCK CONVERSION

FIELD OF THE INVENTION

The present invention relates to the field of radio-frequency (RF) signal detection, and, more particularly, to millimeter-wave (MMW) detectors/converters and related methods.

BACKGROUND OF THE INVENTION

Millimeter wave (MMW) detection and block conversion systems tend to be costly. As a result, they are not included in systems or less effective low cost subsystems are utilized. The current state of the art falls in two categories: (1) crystal video receivers (CVRs) which are low cost but include low sensitivity detection of the envelope of the MMW transmission; and (2) RF channelization/conversion which is similar to microwave detection and conversion but costly due to performance limitations of components such as mixers, amplifiers, transmission lines and filters.

SUMMARY OF THE INVENTION

In view of the foregoing background, it is therefore an object of the present invention to provide a cost effective and high performance MMW detection and block conversion system and method.

This and other objects, features, and advantages in accordance with the present invention are provided by a radio frequency (RF) signal detector and block converter including a first fiber optic transmitter (FOT) having an RF signal input, to receive a millimeter wave (MMW) signal, for example, and to generate a multiple sideband optical signal including at least a first sideband and a second sideband on a first optical output, and a second FOT having a reference signal input and to generate a second optical signal including at least a reference sideband on a second optical output. A first wavelength division multiplexing (WDM) optical filter is connected to the first optical output of the first FOT to separate the first sideband into a plurality of first sideband channels, and to separate the second sideband into a plurality of second sideband channels, and a second WDM optical filter is connected to the second optical output of the second FOT to separate the reference sideband into a plurality of reference sideband channels.

A detector is connected to the first WDM optical filter to receive the plurality of first sideband channels, and includes a camera, such as a CCD, and digital processor to detect an active channel from among the plurality of first sideband channels. A first fiber array is connected to the first WDM optical filter to receive the plurality of second sideband channels, and a second fiber array is connected to the second WDM optical filter to receive the plurality of reference sideband channels. An optical coupler is connected to the first and second fiber arrays to generate a combined signal by combining the plurality of second sideband channels and the plurality of reference sideband channels, and a photodetection block receives and processes the combined signal based upon the detected active channel.

The first and second FOTs preferably each comprises a microwave fiber optic transmitter (MFOT), and the first and second WDM optical filters preferably each comprises dense wavelength division multiplexing (DWDM) optical filter. The first and second FOTs may use double sideband suppressed carrier (DSBSC) optical modulation to generate the respective optical signals. The first and second WDM optical filters may each comprise an Optical Tapped Delay Line (OTDL), and bulk or integrated optics are between the first WDM optical filter and the detector. The first and second fiber arrays may each comprise a linear fiber array.

Objects, features, and advantages in accordance with the present invention are provided by a method for detecting a radio frequency (RF) signal comprising generating a multiple sideband optical signal including at least a first sideband and a second sideband with a first fiber optic transmitter (FOT) having an RF signal input and a first optical output, and generating a second optical signal including at least a reference sideband with a second fiber optic transmitter having a reference signal input and a second optical output. The method further includes separating the first sideband into a plurality of first sideband channels, and separating the second sideband into a plurality of second sideband channels with a first wavelength division multiplexing (WDM) optical filter connected to the first optical output of the first FOT, and separating the reference sideband into a plurality of reference sideband channels with a second WDM optical filter connected to the second optical output of the second FOT. An active channel is detected from among the plurality of first sideband channels with a detector connected to the first WDM optical filter to receive the plurality of first sideband channels. The detector includes a camera and digital processor. A combined signal is generated by combining the plurality of second sideband channels and the plurality of reference sideband channels with an optical coupler connected to first and second fiber arrays respectively receiving the plurality of second sideband channels and the plurality of reference sideband channels. The method includes processing the combined signal based upon the detected active channel.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
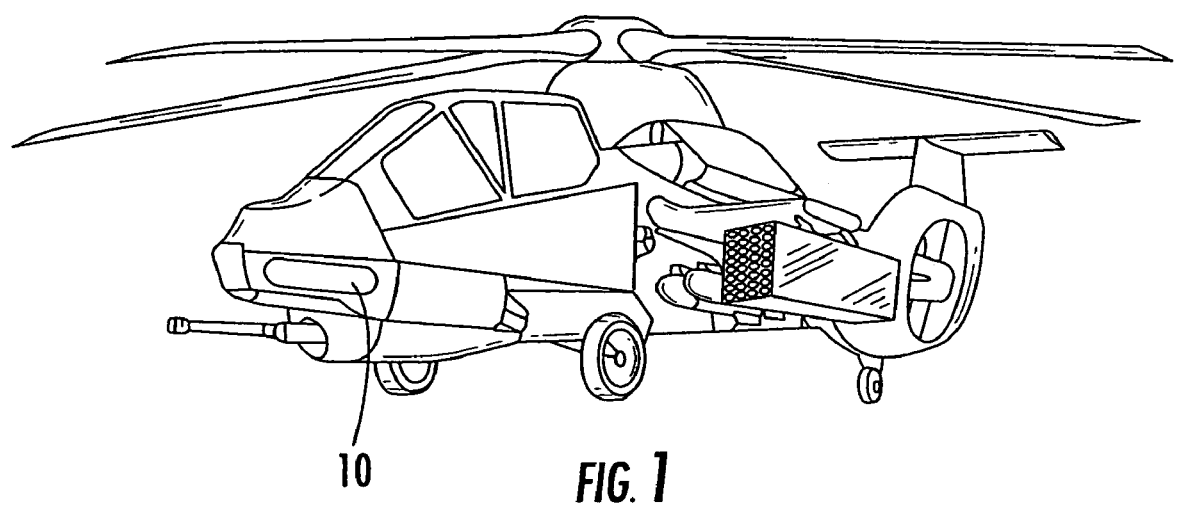
FIG. 1 is a perspective view of an aircraft including a surveillance system in accordance with the present invention.
Figure 2:
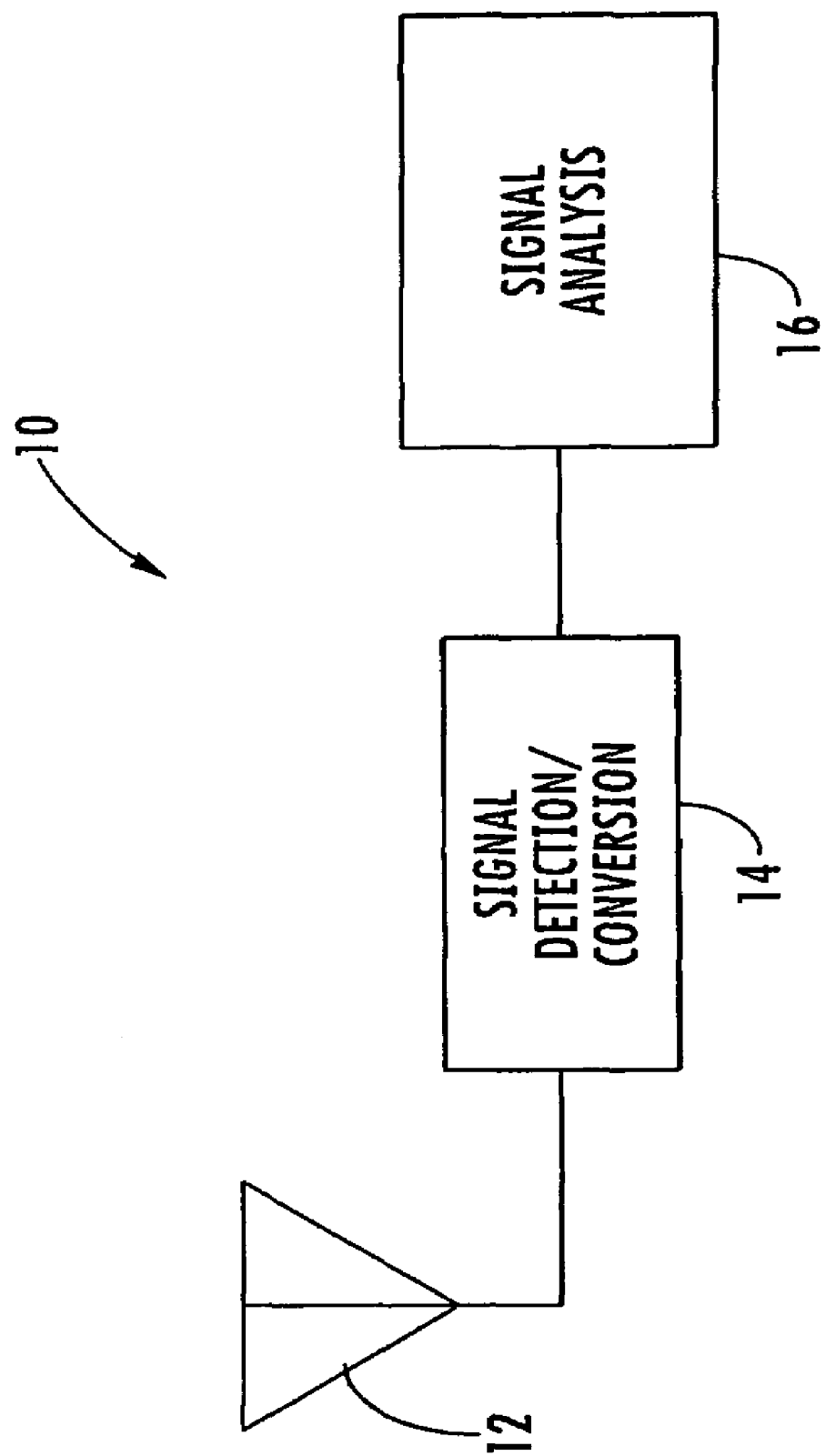
FIG. 2 is a schematic diagram of the surveillance system of FIG. 1.

Referring initially to FIGS. 1 and 2, an aircraft, such as a helicopter, is equipped with a surveillance system 10 having an antenna 12, such as a phased array antenna, a signal detection/conversion device 14 and a signal analysis device 16. As discussed in the background section above, because of costs, millimeter wave (MMW) detection and block conversion for conventional surveillance systems may not be used, or less effective subsystems are utilized. Accordingly, in contrast to conventional systems, the surveillance system 10 of the present invention includes a cost effective and high performance MMW subsystem. Of course the MMW subsystem of the present invention may be applicable to other radar and detection systems as would be appreciated by those skilled in the art.

The term "millimeter-wave" is intended to include, broadly, at least the entire millimeter and sub-millimeter portions of the electromagnetic (EM) spectrum (i.e. about 30-3,000 Ghz).

Figure 3:
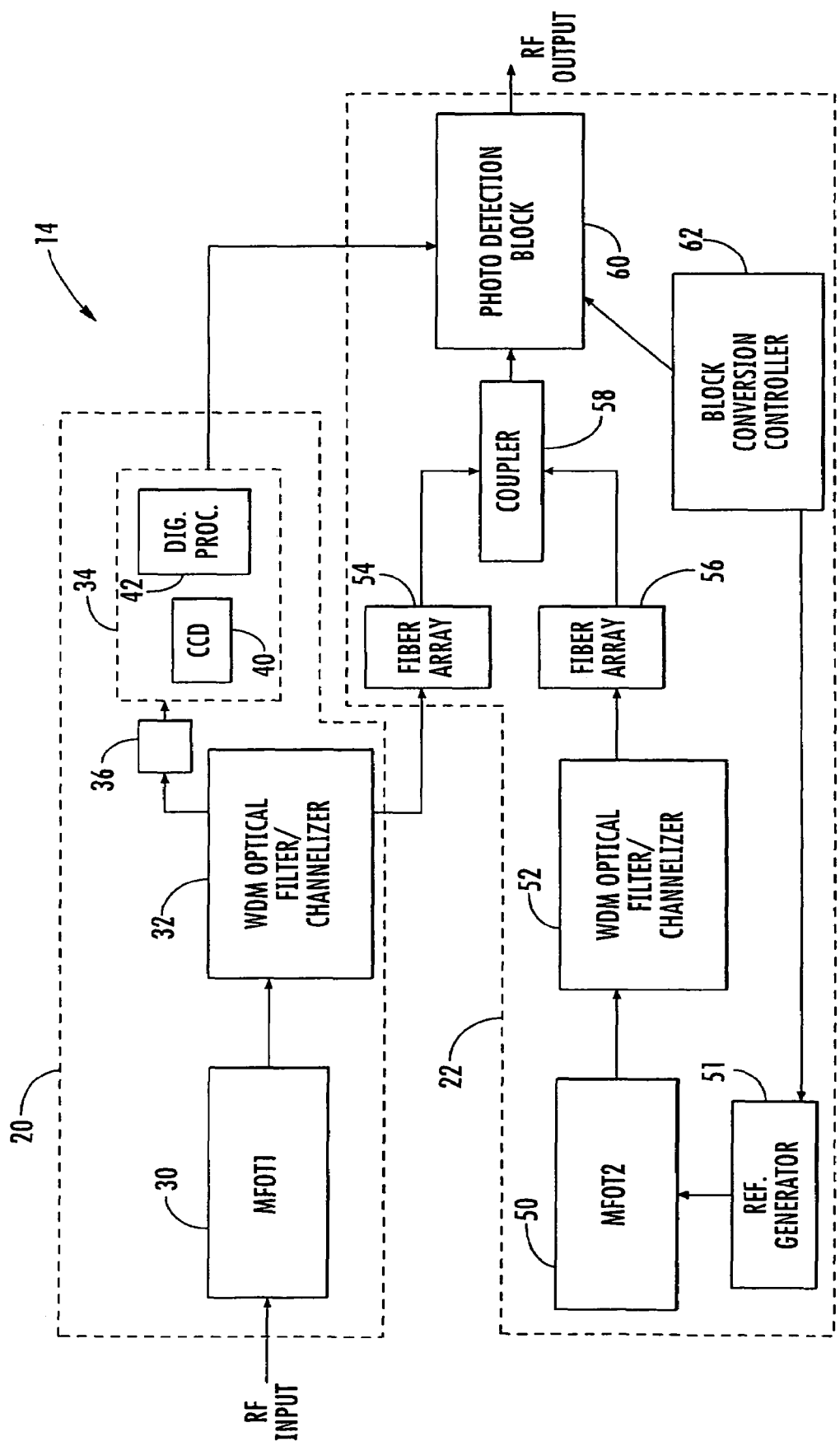
FIG. 3 is a schematic diagram of a detection/conversion device of the surveillance system of FIG. 2.

Referring now to FIG. 3, the detection/conversion device 14 of the surveillance system 10 is a radio frequency (RF) signal detector and block converter which will now be described. The device 14 includes a millimeter wave (MMW) signal detector 20 connected to the antenna 12. The MMW signal detector 20 includes a first fiber optic transmitter (FOT) 30 having an RF signal input, to receive a millimeter wave (MMW) signal picked up by the antenna 12, for example. The FOT is preferably a microwave FOT (MFOT) and may be combined with an optical node to generate a double sideband suppressed carrier (DSBSC) optical signal including at least a first or upper sideband and a second or lower sideband on a first optical output. The MFOT is preferably the MT-H-60-WDM/TDM MFOT manufactured by Harris Corporation of Melbourne, Fla.

Regarding the use of DSBSC modulation, it should be noted that without such modulation the amplitude modulated output of a modulator comprises a large carrier signal component and information-bearing upper and lower sidebands, as would be appreciated by the skilled artisan. The majority of the signal power transmitted on the optical link is concentrated in the carrier component; that is, that part of the signal output which does not convey information. The information is contained in the sidebands, which comprise a relatively small part of the optical power transmitted on the link. The large carrier component in the modulator output produces a high DC level in the optical detector, thereby reducing its sensitivity to the much lower magnitude information signals on the link. This limits the dynamic range of the optical link. However, using spectrally efficient double sideband suppressed carrier DSBSC optical modulation minimizes noise and allows for high DR links by eliminating the "DC" component.

A first wavelength division multiplexing (WDM) optical filter 32 is connected to the first optical output of the first FOT 30. The WDM optical filter 32 is preferably a dense wavelength division multiplexing (DWDM) optical filter and may comprise an Optical Tapped Delay Line (OTDL) such as described in U.S. Pat. No. 6,608,721 to Turpin et al. and/or U.S. Patent Application Publication No. 2003/0128917 A1 also to Turpin et al., both of the entire disclosures of which are incorporated by reference herein. Such an WDM optical filter 32 is preferably the "Hyperfine WDM" optical channelizer/filter by ESSEX Corporation of Columbia, Md.

The WDM optical filter 32 separates the first or upper sideband into a plurality of first sideband channels, and separates the second or lower sideband into a plurality of second sideband channels. A detector 34 is connected to the first WDM optical filter 32 to receive the plurality of first sideband channels, and includes a camera 40, such as a CCD, and digital signal processor (DSP) 42 to detect an active channel from among the plurality of first sideband channels. Also, bulk or integrated optics 36 are between the first WDM optical filter 32 and the detector 34.

The detection/conversion device 14 of the surveillance system 10 also includes a block converter 22 having a second FOT 50 with a reference signal input receiving a reference signal from a reference signal generator 51, for example. The second FOT 50 is also preferably a microwave FOT (MFOT) and may be combined with an optical node to generate a second double sideband suppressed carrier (DSBSC) optical signal of which one of the sidebands is used as a reference sideband. Again, the MFOT is preferably the MT-H-60-WDM/TDM MFOT manufactured by Harris Corporation of Melbourne, Fla.

A second WDM optical filter 52 is connected to the optical output of the second FOT 50 to separate the reference sideband into a plurality of reference sideband channels. As discussed above with reference to the WDM optical filter 32, the second WDM optical filter 52 is also preferably a dense wavelength division multiplexing (DWDM) optical filter and may comprise an Optical Tapped Delay Line (OTDL) such as described in U.S. Pat. No. 6,608,721 to Turpin et al. and/or U.S. Patent Application Publication No. 2003/0128917 A1 also to Turpin et al. Again, the second WDM optical filter 52 is preferably the "Hyperfine WDM" optical channelizer/filter by ESSEX Corporation of Columbia, Md.

A first linear fiber array 54 is connected to the first WDM optical filter 32 to receive the plurality of second sideband channels, and a second linear fiber array 56 is connected to the second WDM optical filter 52 to receive the plurality of reference sideband channels. An optical coupler 58 is connected to the first and second fiber arrays 54/56 to generate a combined signal by combining the plurality of second sideband channels and the plurality of reference sideband channels. A photodetection block 60 downstream from the coupler receives the combined signal and ouputs the converted signal to the desired IF passband (e.g. the 8-10 GHz) based upon the detected active channel from detector 34. A block conversion controller 62 is provided to control the photodetection block 60 and the reference signal generator 51.

In a preferred embodiment, for both FOTs 30, 50, the lower sideband is used. For example, a 20-40 GHz mmW signal band is converted into a common IF block of frequencies from 8-10 GHz. To do this, the first fiber in the fiber array 54 would be centered on 21 GHz and spatially overlap the optical spectrum from 20-22 GHz. The second fiber is 22-24 GHz and so on until the last fiber which is 38-40 GHz. The reference FOT 50 would either generate a reference spectrum that includes CW tones starting at 12 GHz and going to 30 GHz in 2 GHz steps or a single tone (for example if the detection portion of the detection/block converter system determines the frequency band of signal energy and steers the reference input frequency or the block converter is stepped on a scheduled search profile). The reference FOT 50 would have its first fiber centered on 12 GHz, second on 14 GHz, and so on. The fiber array 54, 56 outputs would align with the first fiber being feed into the coupler 58 from both the signal and reference FOT 30, 50. It is preferable to not have more than one channel (fiber) per coupler.

An alternative embodiment would include a stepped block converter so that the output of the signal FOT fiber array 54 feeds an optical switch that enters a single coupler. In this case, only one channel would be looked at during a dwell period which also simplifies the design by eliminating the need for the second WDM optical filter 52 or Hyperfine device in the reference path (only one frequency is present at a time so filtering is not required). Another embodiment would be each fiber pair (i.e. first, second . . . etc.) of the fiber arrays 54, 56 being fed into a coupler so that all ten 2 GHz bands are converted to the 8-10 GHz range to process all the channels in parallel. For each channel you want to look at in the RF domain you need a photodetector. For the case of the stepped converter, you would need one photodetector on the output of the one coupler.

In the case of ten couplers, you could use an optical switch to select any coupler output to route to a photodetector (benefit being fast tuning upon detection of energy and improved probability of intercept). The number of detectors switched into would be system dependent, most applications would be less than four and most often one would be adequate. Yet another option would be to have a photodetector on the output of each coupler and then use an RF switch to route the signals into a microwave analysis receiver. Although feasible, this would most likely be the most expensive and the RF switch loss would hurt performance.

The approach of the present invention combines the wide bandwidth signal transmission capability of fiber optics with the high quality optical filtering capability of the Hyperfine DWDM technology to perform the transmission, filtering and detection/conversion in the optical domain. The invention utilizes the spectrally efficient double sideband suppressed carrier optical modulation which minimizes noise and allows for High DR links by eliminating the "DC" component. The optical receiver acts as the nonlinear device to mix the optical signal back to a baseband/IF signal for post processing. The invention provides a cost effective approach for a high performance MMW subsystem that, by exploiting both optical sidebands, can perform detection and block conversion within a single hardware configuration item (HWCI), and the dynamic range is on par with other high performance MMW systems.

Figure 4:
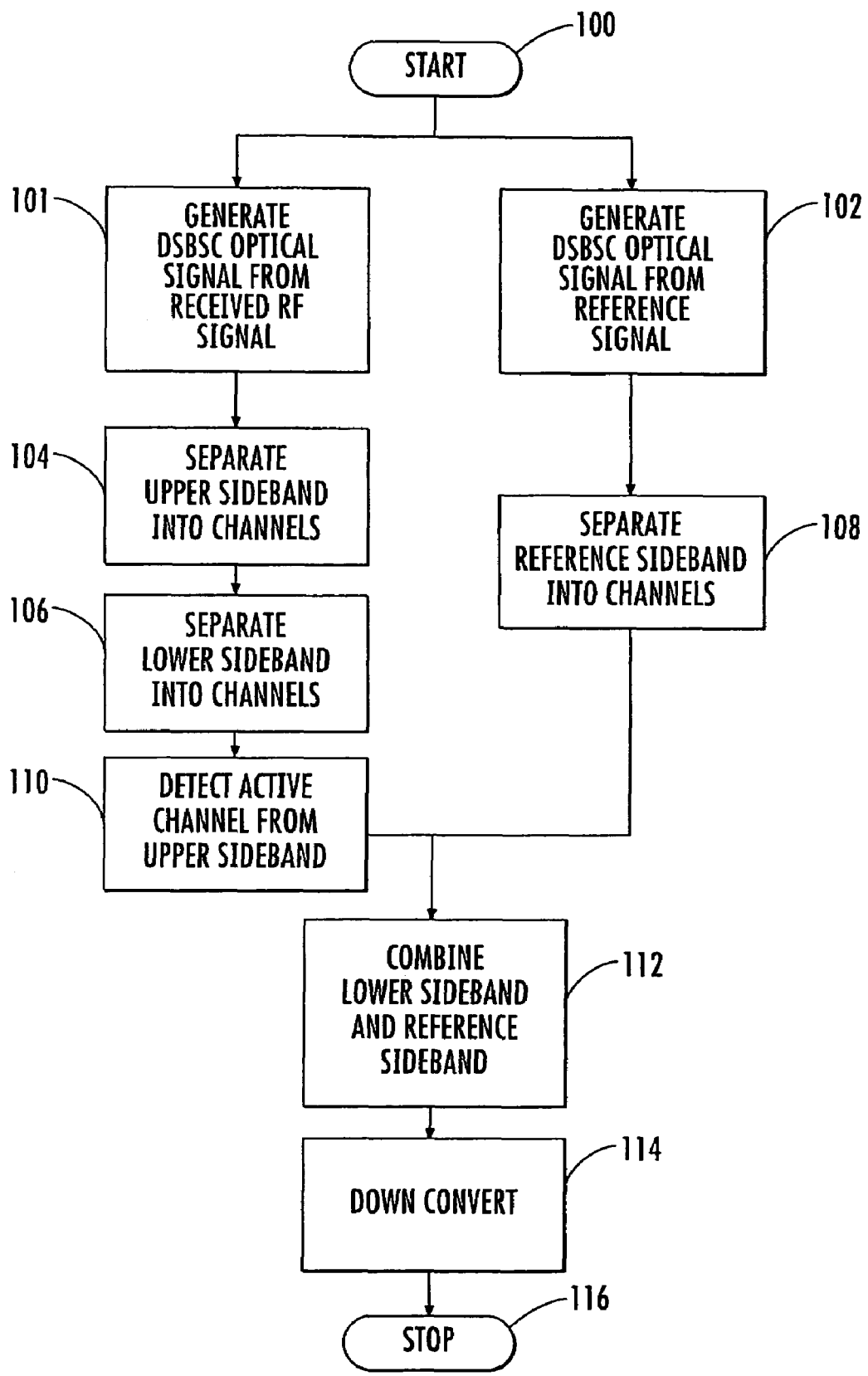
FIG. 4 is a flowchart illustrating various method steps in accordance with the present invention.

Referring now additionally to the flowchart of FIG. 4, a method for detecting a radio frequency (RF) signal will now be described. The method begins (block 100) and includes, at block 101, generating a multiple sideband optical signal including at least a first sideband and a second sideband, for example with a first fiber optic transmitter (FOT) 30 having an RF signal input and a first optical output. In a parallel step, block 102, the method includes generating a second optical signal including at least a reference sideband, for example with a second FOT 50 having a reference signal input and a second optical output.

The method further includes separating the first sideband into a plurality of first sideband channels (block 104), and separating the second sideband into a plurality of second sideband channels (block 106), for example with a first wavelength division multiplexing (WDM) optical filter 32 connected to the first optical output of the first FOT 30. At block 108, the reference sideband is separated into a plurality of reference sideband channels, for example with a second WDM optical filter 52 connected to the second optical output of the second FOT 50. An active channel is detected from among the plurality of first sideband channels (block 110), for example with a detector 34 connected to the first WDM optical filter 32 to receive the plurality of first sideband channels. As described above, the detector 34 preferably includes a camera 40 and digital processor 42. At block 112, a combined signal is generated by combining the plurality of second sideband channels and the plurality of reference sideband channels, for example with an optical coupler 58 connected to first and second fiber arrays 54/56 respectively receiving the plurality of second sideband channels and the plurality of reference sideband channels. The method includes photodetection of the combined signal (block 114), for example with a photodetection block which receives the combined signal and ouputs the converted signal to the desired IF passband (e.g. the 8-10 GHz) based upon the detected active channel from detector 34.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) signal detector and block converter comprising:
    a first fiber optic transmitter (FOT) having an RF signal input and to generate a multiple sideband optical signal including at least a first sideband and a second sideband on a first optical output;
    a second fiber optic transmitter having a reference signal input and to generate a second optical signal including at least a reference sideband on a second optical output;
    a first wavelength division multiplexing (WDM) optical filter connected to the first optical output of the first FOT to separate the first sideband into a plurality of first sideband channels, and to separate the second sideband into a plurality of second sideband channels;
    a second WDM optical filter connected to the second optical output of the second FOT to separate the reference sideband into a plurality of reference sideband channels;
    a detector connected to the first WDM optical filter to receive the plurality of first sideband channels, and comprising a camera and digital processor to detect an active channel from among the plurality of first sideband channels;
    a first fiber array connected to the first WDM optical filter to receive the plurality of second sideband channels;
    a second fiber array connected to the second WDM optical filter to receive the plurality of reference sideband channels;
    an optical coupler connected to the first and second fiber arrays to generate a combined signal by combining the plurality of second sideband channels and the plurality of reference sideband channels; and
    a photodetection block to receive and process the combined signal based upon the detected active channel.

2. The RF signal detector and block converter according to claim 1 wherein the first and second FOTs each comprises a microwave fiber optic transmitter (MFOT).

3. The RF signal detector and block converter according to claim 1 wherein the first and second WDM optical filters each comprise dense wavelength division multiplexing (DWDM) optical filters.

4. The RF signal detector and block converter according to claim 1 wherein the first and second FOTs use double sideband suppressed carrier (DSBSC) optical modulation to generate the respective optical signals.

5. The RF signal detector and block converter according to claim 1 wherein the first and second WDM optical filters each comprises an Optical Tapped Delay Line (OTDL).

6. The RF signal detector and block converter according to claim 5 further comprising bulk optics between the first WDM optical filter and the detector.

7. The RF signal detector and block converter according to claim 5 further comprising integrated optics between the first WDM optical filter and the detector.

8. The RF signal detector and block converter according to claim 1 wherein the camera comprises a charge-coupled device (CCD) camera.

9. The RF signal detector and block converter according to claim 1 wherein the first FOT receives a millimeter wave (MMW) signal.

10. The RF signal detector and block converter according to claim 1 wherein the first and second fiber arrays each comprises a linear fiber array.

11. A surveillance system comprising:
an antenna;
a millimeter wave (MMW) signal detector connected to the antenna and including
   a first microwave fiber optic transmitter (MFOT) having an RF signal input and to generate a multiple sideband optical signal including at least a first sideband and a second sideband on a first optical output,
   a first dense wavelength division multiplexing (DWDM) optical filter connected to the first optical output of the first FOT to separate the first sideband into a plurality of first sideband channels, and to separate the second sideband into a plurality of second sideband channels, and
   a detector connected to the first DWDM optical filter to receive the plurality of first sideband channels, and comprising a camera and digital processor to detect an active channel from among the plurality of first sideband channels;
a block converter including
   a second MFOT having a reference signal input and to generate a second optical signal including at least a reference sideband on a second optical output,
   a second DWDM optical filter connected to the second optical output of the second MFOT to separate the reference sideband into a plurality of reference sideband channels,
   a first fiber array connected to the first DWDM optical filter to receive the plurality of second sideband channels,
   a second fiber array connected to the second DWDM optical filter to receive the plurality of reference sideband channels,
   an optical coupler connected to the first and second linear fiber arrays to generate a combined signal by combining the plurality of second sideband channels and the plurality of reference sideband channels, and
   a photodetection block to receive and process the combined signal to an intermediate frequency (IF) signal based upon the detected active channel; and
a signal analyzer downstream from the signal processor for analyzing the IF signal.

12. The surveillance system according to claim 11 wherein the first and second MFOTs use double sideband suppressed carrier (DSBSC) optical modulation to generate the respective optical signals.

13. The surveillance system according to claim 12 wherein the first and second DWDM optical filters each comprises an Optical Tapped Delay Line (OTDL).

14. The surveillance system according to claim 11 wherein the camera comprises a charge-coupled device (CCD) camera.

15. The surveillance system according to claim 11 wherein each of the first and second fiber arrays comprises a linear fiber array.

16. A method for detecting a radio frequency (RF) signal comprising:
generating a multiple sideband optical signal including at least a first sideband and a second sideband with a first fiber optic transmitter (FOT) having an RF signal input and a first optical output;
generating a second optical signal including at least a reference sideband with a second fiber optic transmitter having a reference signal input and a second optical output;
separating the first sideband into a plurality of first sideband channels, and separating the second sideband into a plurality of second sideband channels with a first wavelength division multiplexing (WDM) optical filter connected to the first optical output of the first FOT;
separating the reference sideband into a plurality of reference sideband channels with a second WDM optical filter connected to the second optical output of the second FOT;
detecting an active channel from among the plurality of first sideband channels with a detector connected to the first WDM optical filter to receive the plurality of first sideband channels, the detector comprising a camera and digital processor;
generating a combined signal by combining the plurality of second sideband channels and the plurality of reference sideband channels with an optical coupler connected to first and second fiber arrays respectively receiving the plurality of second sideband channels and the plurality of reference sideband channels; and
processing the combined signal based upon the detected active channel.

17. The method according to claim 16 wherein the first and second FOTs each comprises a microwave fiber optic transmitter (MFOT).

18. The method according to claim 16 wherein the first and second WDM optical filters each comprises dense wavelength division multiplexing (DWDM) optical filters.

19. The method according to claim 18 wherein the first and second DWDM optical filters uses double sideband suppressed carrier (DSBSC) optical modulation to generate the respective optical signals.

20. The method according to claim 18 wherein the first and second DWDM optical filters each comprises an Optical Tapped Delay Line (OTDL).

21. The method according to claim 18 wherein the camera comprises a charge-coupled device (CCD) camera.

22. The method according to claim 18 wherein the first FOT receives a millimeter wave (MMW) signal.

23. The method according to claim 18 wherein the first and second fiber arrays each comprises a linear fiber array.

* * * * *